United States Patent
Inaba

[11] Patent Number: 6,105,296
[45] Date of Patent: Aug. 22, 2000

[54] STEREO SLIDE MOUNT

[76] Inventor: Minoru Inaba, No. 1116, Oaza Samukawa, Oyama-shi, Tochigi-ken, Japan

[21] Appl. No.: 08/851,257

[22] Filed: May 5, 1997

[51] Int. Cl.[7] .................................................... A47G 1/06
[52] U.S. Cl. ................................. 40/707; 40/701; 40/703
[58] Field of Search ............................ 40/701, 703, 704, 40/705, 707, 649, 362, 366, 367, 618

[56] References Cited

U.S. PATENT DOCUMENTS

| | | | |
|---|---|---|---|
| 1,266,142 | 5/1918 | Motsch | 40/649 X |
| 1,445,290 | 2/1923 | Buck | 40/362 |
| 2,292,312 | 8/1942 | Wittel et al. | 40/707 |
| 2,449,727 | 9/1948 | Sloane | 40/649 |
| 2,540,718 | 2/1951 | Duskin | 40/618 X |
| 2,713,015 | 7/1955 | Paulsohn | 40/649 X |
| 2,739,401 | 3/1956 | Balter | 40/705 X |
| 2,823,478 | 2/1958 | Ostergaard et al. | 40/707 |
| 2,842,883 | 7/1958 | Folwell et al. | 40/705 X |
| 3,133,368 | 5/1964 | Perrot | 40/707 |
| 3,235,991 | 2/1966 | Harper et al. | 40/707 X |
| 3,242,605 | 3/1966 | Kleinschmidt | 40/705 |
| 3,325,932 | 6/1967 | Selinsky | 40/701 |
| 3,389,485 | 6/1968 | Roubal | 40/705 |
| 3,808,722 | 5/1974 | Byers | 40/705 |
| 4,031,640 | 6/1977 | Hanna, Jr. et al. | 40/703 X |
| 4,104,818 | 8/1978 | Hrabik | 40/707 |
| 4,132,480 | 1/1979 | Reed | 40/701 X |
| 4,314,416 | 2/1982 | Lorsch | 40/701 |
| 4,431,282 | 2/1984 | Martin geb. Böser . | |
| 4,530,570 | 7/1985 | Vitrac | 40/366 X |
| 5,392,548 | 2/1995 | Truc et al. . | |
| 5,685,626 | 11/1997 | Ihaba | 40/705 X |

*Primary Examiner*—Joanne Silbermann
*Attorney, Agent, or Firm*—Fattibene & Fattibene; Paul A. Fattibene; Arthur T. Fattibene

[57] ABSTRACT

A stereo slide mount can reproduce an accurate stereo effect to facilitate easiness of mounting operation and accurate positioning. Plural types of stereo slide mounts 1 (#1 to #n) that widths W of windows stepwisely decrease have the same pitch Pw of the windows and different width W of the windows and fitting pitches of right and left films. A base film is provided with a positioning pin 6 for engaging perforations of the film, and a cover frame is provided with pin holes 7 to be engaged with the positioning pins 6. The positioning pins 6 and the pin holes 7 are provided at positions that the inner vertical sides of the windows are brought into agreement with the inner edges of the pictures of the film. The stereo slide mount having smaller widths of the windows increases gap width ($P_0$, $P_1$, $P_2$, . . . ) between two sets of right and left positioning pins 6 to extend the pitches of the right and left films, and the outer masking amounts of the right and left films increase.

14 Claims, 12 Drawing Sheets

FIG. 2a
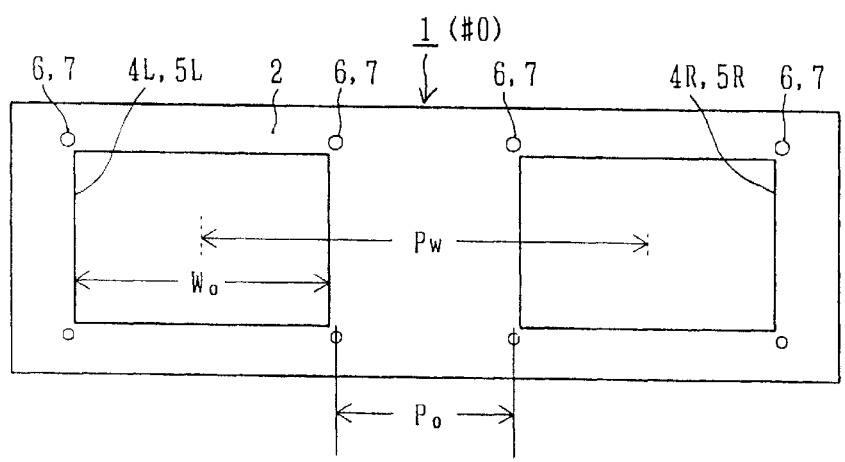
FIG. 2b
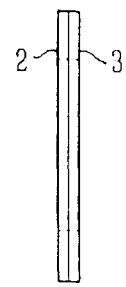
FIG. 2c
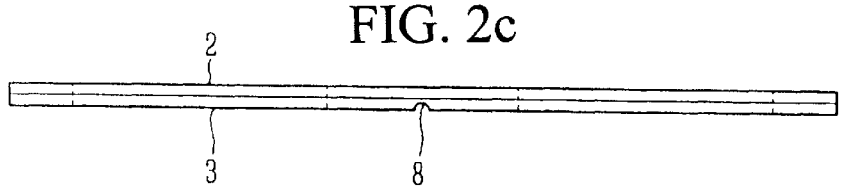
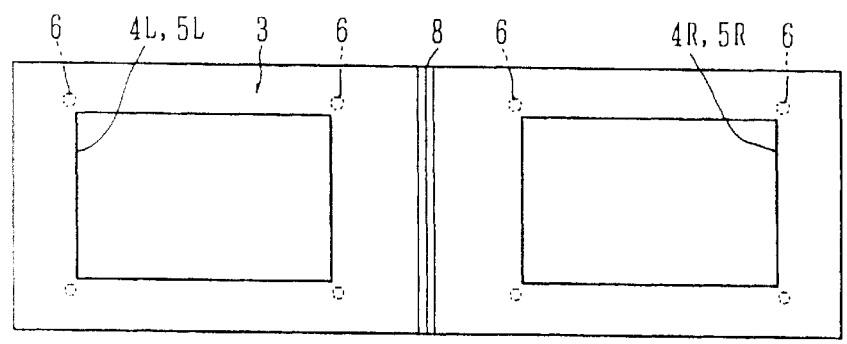
FIG. 2d

FIG. 3a
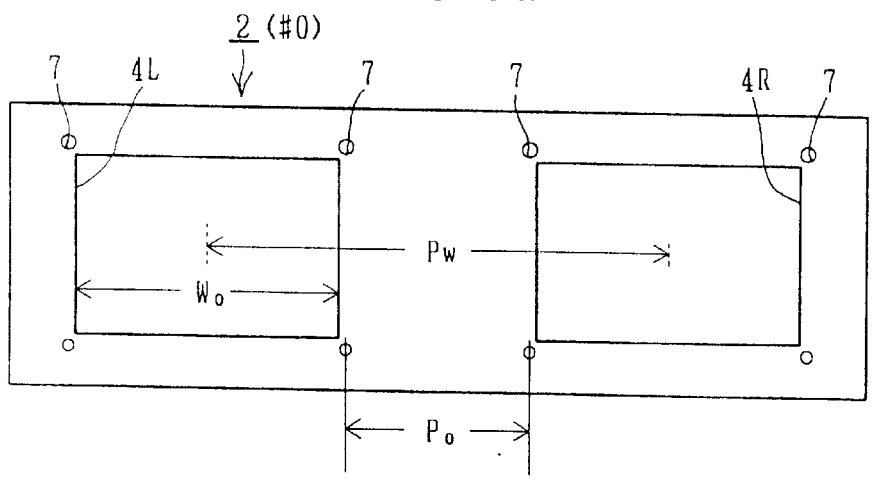
FIG. 3b
FIG. 3c
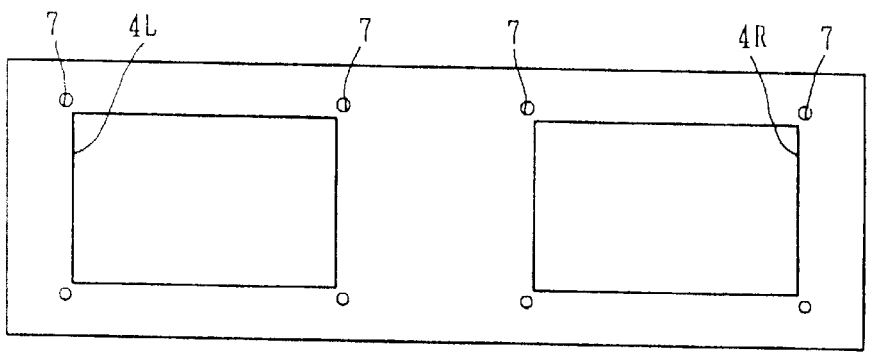
FIG. 3d

FIG. 4a
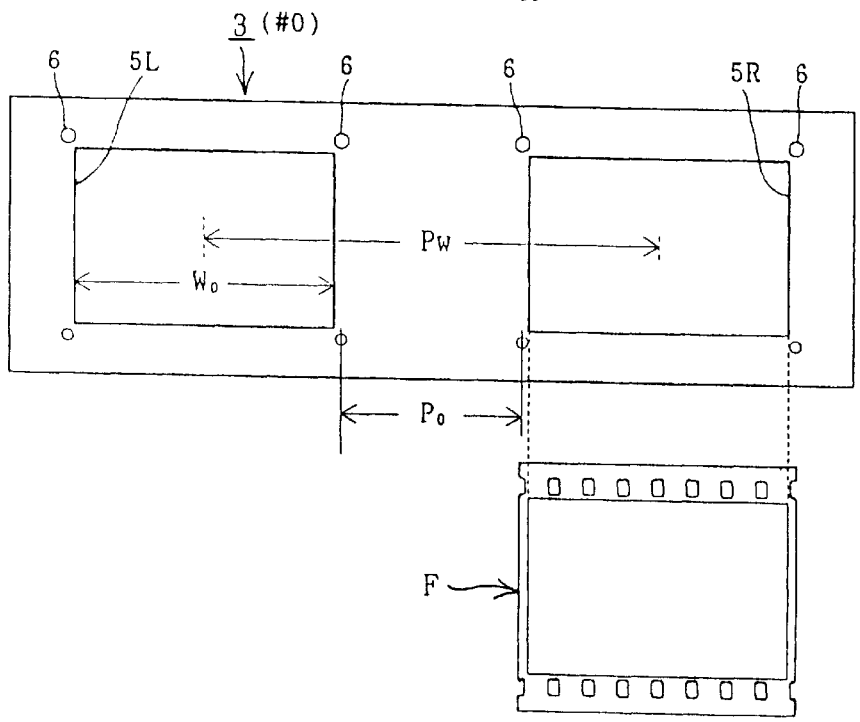
FIG. 4b
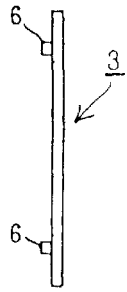
FIG. 4c
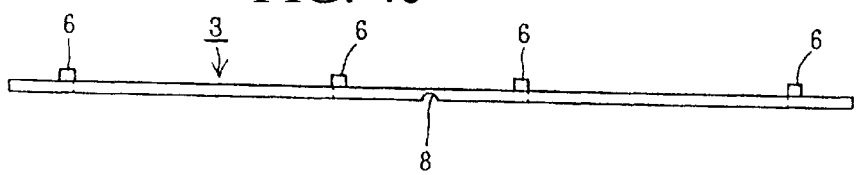
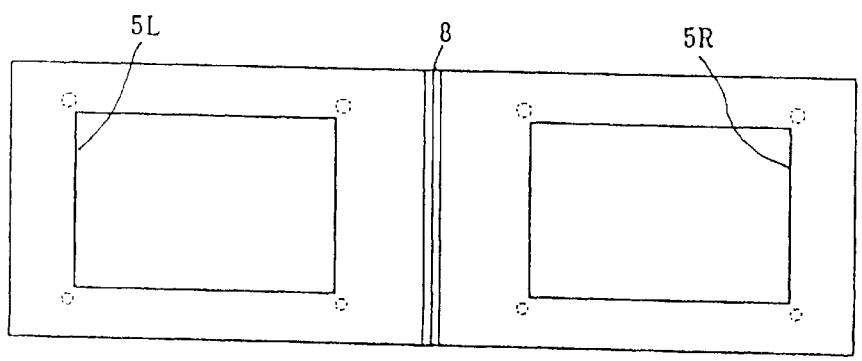
FIG. 4d

STEREO SLIDE MOUNT

BACKGROUND OF THE INVENTION

1. Field of the Invention

The present invention relates to a stereo slide mount. More specifically, the invention relates to a stereo slide mount for providing an accurate solid image by masking outer sides of right and left pictures.

2. Description of the Prior Art

In a stereo slide photographed by a stereo camera of the structure that an interval between optical axes of right and left lenses is fixed, non-overlapping portions that photographing ranges of right and left photographing pictures are not brought into agreement with each other are formed due to a difference in the visual field of the right and left photographing lenses of the stereo camera. These non-overlapping portions do not contribute to forming a solid image when the slides are viewed by using a stereo slide viewer. When the stereo slide that the non-overlapping portions are not masked is viewed by two eyes, the edges of the other windows appear as vertical lines along the boundaries of the overlapping portions and the non-overlapping portions to impair taste. Accordingly, to prevent this, the windows of the stereo slide mount have been formed in a width narrower than the size of the picture of the slide films to mask the non-overlapping portions.

Widths of the non-overlapping portions to be masked increase as the photographing distance of a subject to affect the most influence to matching of right and left pictures approaches. Therefore, there have been provided plural kinds of stereo slide mounts having stepwisely different widths of windows. The stereo slide mount having the width of the window of a suitable masking amount is selected from these stereo slide mounts to mount the slide film. However, it is not easy to judge the masking amount by viewing a pair of slide films cut after each frame, and there arises a problem that the stereo slid mount is frequently erroneously selected.

In obtaining a suitable stereo effect in the stereo slide, it is known that a subject to affect the most influence to matching of right and left images should be disposed at the same positions in the right and left windows of the stereo slide mount. If the positions of the subject are different at the right and left, a natural stereo effect is canceled, but the conventional stereo slid mount does not have a criterion of positioning the right-to-left direction of the film, and it has a disadvantage that is not easy to position the film at the suitable positoin.

The present applicant has proposed a stereo slide system that was so formed that a stereo slide mount and a picture masking amount guide device/stereo slide viewer for a stereo slide photographed by a stereo camera having predetermined positional relationship between the perforations of a film and a photographing picture to eliminate the disadvantages of a conventional stereo slide system (Japanese Patent Application No. 8-029177).

The stereo slide mount of the stereo slide system is constituted by a base frame which is provided with film positioning pins in the circumferences of right and left windows, and a cover frame that gap widths between right and left windows are the same and the widths of the windows are stepwisely different. The picture masking-amount guide device/stereo slide viewer can decide a suitable masking amount by observing a solid image while varying the masking amount of the outer region of the picture of the stereo slide. After the masking amount is determined, the perforations of the film are engaged with the positioning pins of the base frame to position the film, the cover frame of the width of the window corresponding to the determined masking amount is selected, and joined to the base frame. Then, the film is positioned at a predetermined position, and the non-overlapping portions of the outer side of the right and left films are masked to obtain an accurate stereo effect.

The above-mentioned stereo slide mount can be accurately and easily positioned at the time of mounting as described above, but since the plural types of the cover frames of the width of the windows for constituting the mount system has the same gap widths between the right and left windows, the pitch at the center between the right and left pictures is narrowed as the widths of the windows is narrowed and hence the optical angles of the two eyes become different depending upon the pitch of the pictures.

The change of the pitch of the right and left pictures is not so large problem at the time of appreciating at all times, but when various stereo slide having large difference of pitches of the pictures is frequently replaced and appreciated for a long time, the adaption of eyes for the change of the optical angle is delayed to feel discomfort or fatigue.

In order to easily mount and accurately position the stereo slide and to provide a stereo slide mount to be easily seen with small fatigue, it becomes necessary to solve a technical assignment. The object of the present invention is to solve this technical assignment.

SUMMARY OF THE INVENTION

The present invention was proposed in order to accomplish the above-mentioned object and provides a stereo slide mount for mounting a stereo slide photographed by using a stereo camera which has the same relative positions of a pair of right and left photographed pictures as those of perforations of a perforated film, wherein said stereo slide mount is constituted by a base frame and a cover frame having two rectangular windows arranged in parallel, respectively, positioning pins are provided on the film-mounting surface of said base film to bring the pictures of two pieces of slide films into agreement with the windows upon engagement with perforations of the slide films that are to be fixed, holes corresponding to said positioning pins are formed in the film-holding surface of said cover frame, and said positioning pins are fitted to said holes in order to join said base frame and said cover frame together, and wherein the width of the windows gradually decreases relative to the width of pictures of the films, plural types of stereo slide mounts that pitches of right and left windows are predetermined are formed to constitute said mount system, said positioning pins and pin holes of said plural types of stereo slid mounts are disposed at the position that inner vertical edges of the right and left windows are brought into agreement with inner vertical edges of the pictures of the film, and the outer shielding areas of the right and left slide films can be adjusted according to a difference of the widths of the windows of said plural types of stereo slide mounts.

BRIEF DESCRIPTION OF THE DRAWINGS

FIG. 1-1 and FIG. 1-2 illustrate a stereo slide mount according to the present invention, wherein FIGS. 1-1(*a*), 1-1(*b*), 1-1(*c*) and 1-2(*d*) are front views of a stereo slide mount that widths of windows stepwisely decrease;

FIG. 2 illustrates the stereo slide mount, wherein FIG. 2(*a*) is a front view, FIG. 2(*b*) is a side view, FIG. 2(*c*) is a bottom view, and FIG. 2(*d*) is a back view;

FIG. 3 illustrates a cover frame of the stereo slide mount, wherein FIG. 3(a), is a front view, FIG. 3(b) is a side view, FIG. 3(c) is a bottom view, and FIG. 3(d) is a back view;

FIG. 4 illustrates a base frame of the stereo slide mount, wherein FIG. 4(a) is a front view, FIG. 4(b) is a side view, FIG. 4(c) is a bottom view, and FIG. 4(d) is a back view;

DESCRIPTION OF THE PREFERRED EMBODIMENTS

Figure 1A:
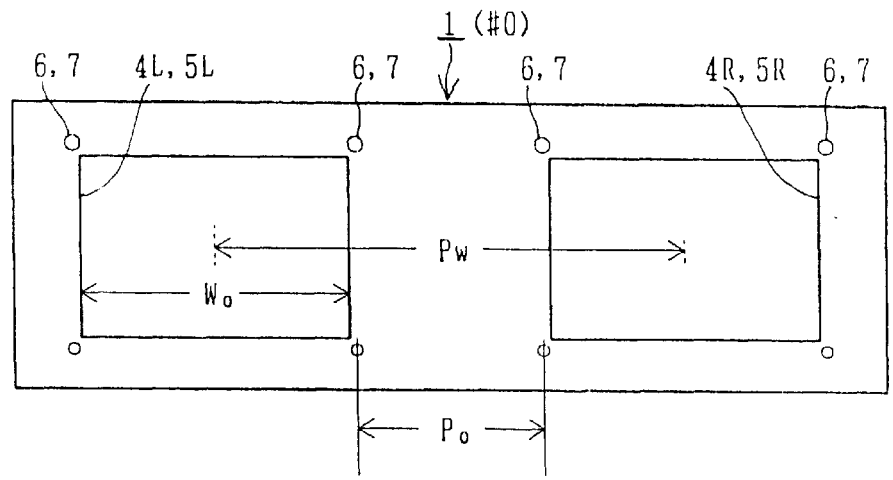
Figure 1B:
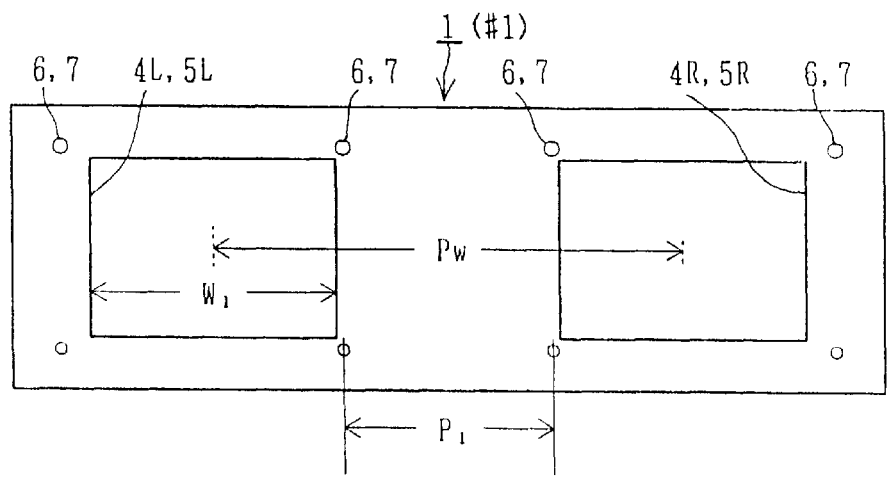
Figure 1C:
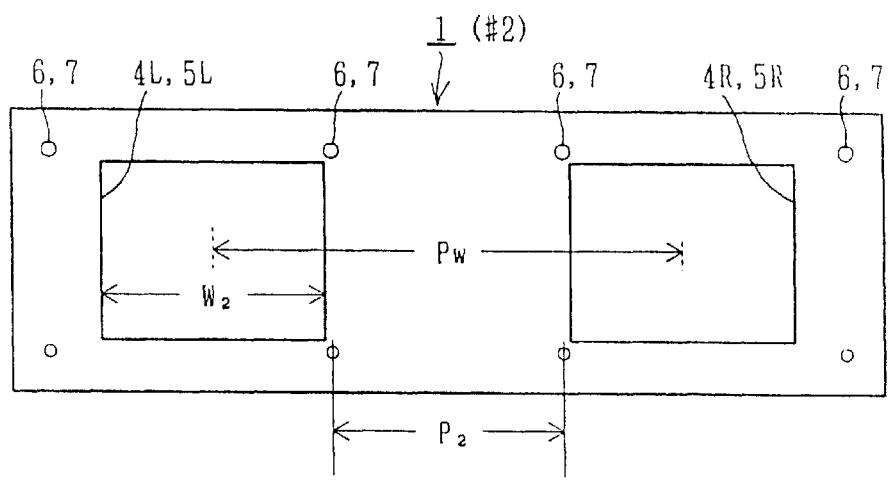
Figure 1D:
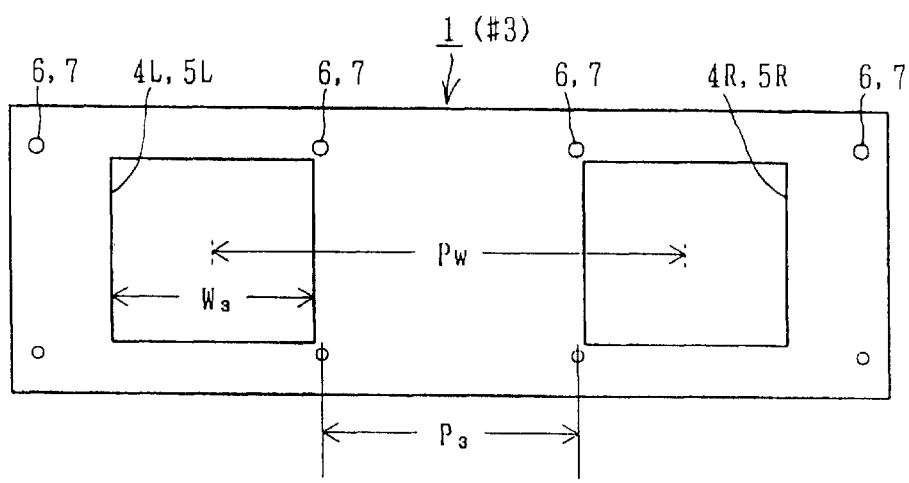
Figure 5:
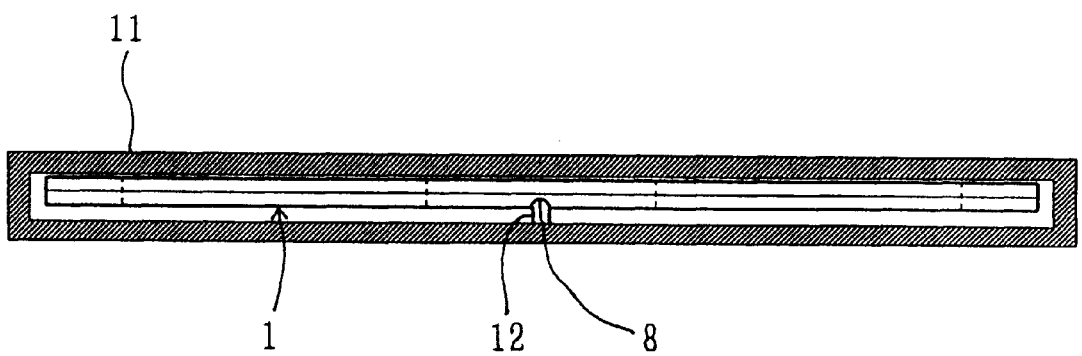
FIG. 5 is a diagram explaining positioning means by a leaf spring of a slide holder and a vertical groove of the stereo slide mount.

Embodiments of the present invention will now be described in detail with reference to FIGS. 1 to 11. FIG. 1-1 and FIG. 1-2 illustrate a stereo slide mount, and a mount system is constituted by plural types of stereo slide mounts 1(#1 to #3) that shapes of profiles are the same and widths W of windows gradually stepwisely decrease. In FIG. 1-1 and FIG. 1-2, widths W of windows stepwisely increase or decrease very little from one step to another to be shown in an exaggerated manner, but a difference of the widths of the windows at each one step should be set to very little. The number of steps from the maximum width of the window that the picture masking amount is smallest (#1) to the minimum width of the window may not be limited to shown four steps.

Fundamental constitutions of all types of stereo slide mounts 1 (#1 to #3) are the same. Pitches Pw of the right and left windows are the same, and the mounting pitches of the widths W of the windows and right and left films are stepwisely different, but the stereo slide mount 1 (#1) having the maximum width of the window will be explained in its structure as an example.

Referring to FIG. 2 and FIG. 4, the stereo slide mount 1 (#1) is constituted by a cover frame 2 and a base frame 3 formed by injection-molding a resin, and are provided with a pair of right and left windows 4R, 4L and 5R, 5L, respectively. The windows 4R and 4L of the cover frame 2 and the windows 5R and 5L of the base frame 3 have vertical and lateral sizes which are the same, and the pitch Pw between the right and left windows is set to be about 63.5 mm of a standard value of the distance between two human eyes or slightly narrower than that.

Referring to FIG. 4, on the base frame 3 are studded cylindrical positioning pins 6 at four places at upper and lower positions on the circumstances of the right and left windows 5R and 5L to engage perforations of the film. In the cover frame 2 shown in FIG. 3 are provided pin holes 7 at symmetrical positions at the positioning pins 6 of the base frame 3. A vertical groove 8 is formed at the center on the rear surface of the base frame 3, and the base frame 3 can be folded at the vertical groove 8 as a hinge.

The positional relationship of the positioning pins 7, pin holes 7 and the windows 4 and 5 of the stereo slide mount 1 is based on that a slide film photographed by a stereo camera so constituted that the perforations of the film are brought in agreement with the relative positions of the picture at the right and left is mounted. Referring to FIG. 4, when the perforations of the right and left ends of the slide film F cut at one frame unit are engaged with the four positioning pins 6 of the base frame 3, the positioning pins 6 and the pin holes 7 are disposed at the positions that the inner vertical edges of the windows 5R and 5L are brought in agreement with the inner vertical edges of the pictures of the slide film F.

Referring to FIG. 1-1 and FIG. 1-2, the pitches Pw of the windows of the stereo slide mount 1 of all the types are the same, the widths ($W_0$, $W_1$, $W_2$, $W_3$) of the windows stepwisely change and gap widths ($P_0$, $P_1$, $P_2$, $P_3$) between two sets of right and left positioning pins 6 become the following relationship when the gap width $P_0$ of the stereo slide mount 1 of #1 is used as a reference.

(#0) $P_0$ (#1) $P_1=P_0+W_0-W_1$ (#2) $P_2=P_0+W_0-W_2$ (#3) $P_3=P_0+W_0-W_3$

Therefore, in all the stereo slide mounts 1 (#1 to #3), the inner vertical sides of the right and left windows 4 and 5 are disposed the same as the relative positions of the positioning pins 6, and in any stereo slide mount, the inner edges of the pictures of the slide film are brought into agreement with the inner edges of the windows 4 and 5. In the stereo slide mounts having smaller widths of the windows, the gap width ($P_0$, $P_1$, $P_2$, $P_3$) between the two sets of right and left positioning pins 6 is increased to extend the pitch of the right and left films, and the outer masking amounts of the right and left films are increased.

In mounting the stereo slide, use of the abovementioned masking-amount guide device or other masking-amount deciding means as prior art makes it possible to determined the masking amount of the film to select the stereo slide mount 1 of the width of the window corresponding to the masking amount. The film is fitting to the right and left windows 5R and 5L of the cover frame 3, the cover frame 3 is mounted on the base frame 3, the positioning pins 6 are engaged with the pin holes 7 to join the cover frame 2 to the base frame 3.

Since the base frame 3 can be folded at the vertical groove 8 as a hinge, either the left half portion or the right half portion can be engaged previously, and the positioning pins 6 can be easily aligned with the pin holes 7, and hence the efficiency of the mounting operation is satisfactory. Since the surface of the cover frame 2 has no bending groove but is molded flatly, it is convenient to describe a title or a photographing memo on the cover frame 2.

The conventional stereo slide viewer is formed slightly wider in the width of the slide holder than the width of the stereo slide mount to facilitate the lading of the stereo slide mount. The lateral positioning of the stereo slide mount is unstable due to a difference of the sizes. However, referring to FIG. 5, a positioning spring 12 is provided at the slide holder 11 of the slide viewer, and the positioning spring 12 is urged to the vertical groove 8 of the stereo slide mount 1. Then, the front and rear and right and left positions of the stereo slide mount 1 can be accurately positioned.

Figure 6:
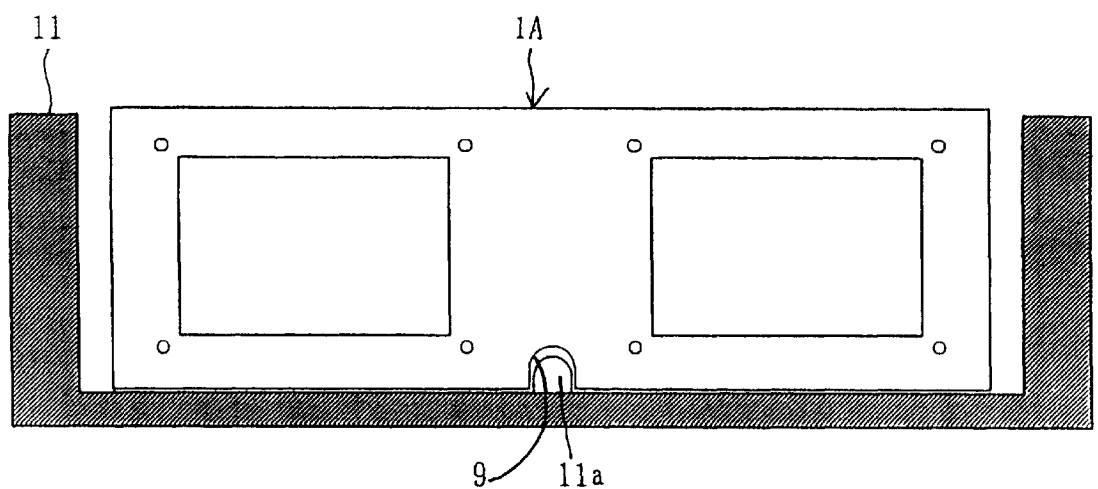
FIG. 6 illustrates another embodiment, and is a diagram explaining positioning means by a protrusion of the slide holder and a notch of the stereo slide mount.

FIG. 6 illustrates other positioning means. A notch 9 is molded at the center of the bottom side of a stereo slide mount 1A, a protrusion 11a to be engaged with the notch 9 is provided at the slide holder 11 of the slide viewer to position the stereo slide mount 1A. As shown in FIG. 6, the upper end of the protrusion 11a is molded in a semi-circular shape, the stereo slide mount 1A is inserted from above the slide holder 11, and smoothly engaged when the notch 9 is engaged with the protrusion 11a. The height of the notch 9 is so slightly higher than the height of the protrusion 11a that the bottom of the stereo slide mount 1A may not float from the bottom of the slide holder 11. As the other effect of the notch 9, there is an advantage that the top-and-bottom of the stereo slide mount 1A can be easily confirmed.

Figure 7:
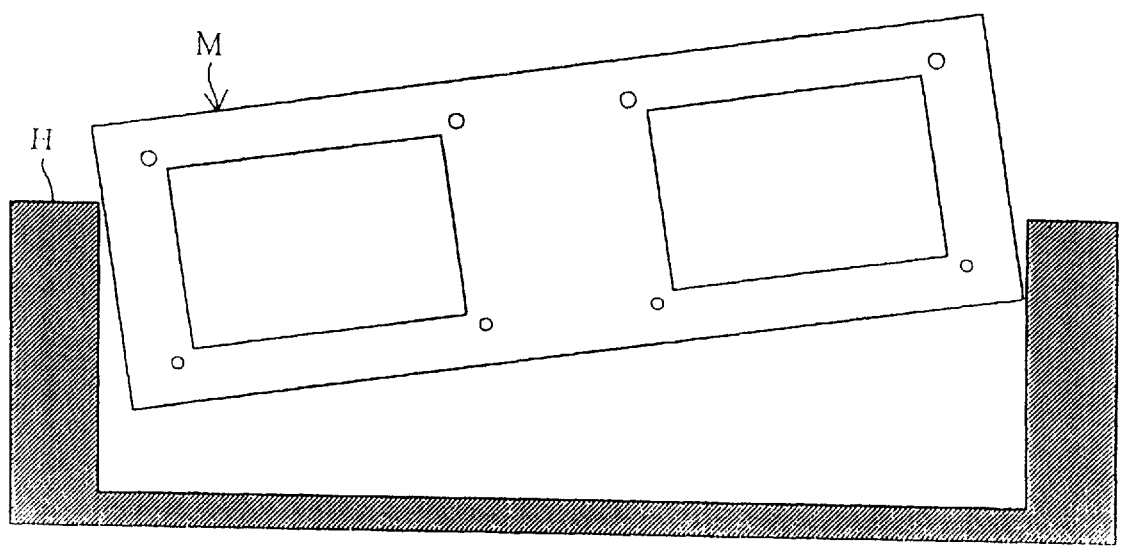
FIG. 7 illustrates a conventional example, and is a diagram explaining the loading failure state of the stereo slide mount.

In inserting, heretofore, the stereo slide mount into the slide holder of the stereo slide viewer, when the stereo slide mount is inclined to the right or left, it frequently occurs, as shown in FIG. 7 that the stereo slide mount M is contacted with both right and left wall surfaces of the slide holder H and the stereo slid mount M is secured being locked to be impossible to be inserted due to the friction. Accordingly, positioning means of the notch 9 and the protrusion 11a is provided, and as shown in FIG. 6, even if the width of the slide holder 11 is considerably widely formed from the width of the stereo slide mount 1A, the lateral positional deviation of the stereo slide mount can be prevented to facilitate the insertion of the stereo slide mount.

Figure 8:
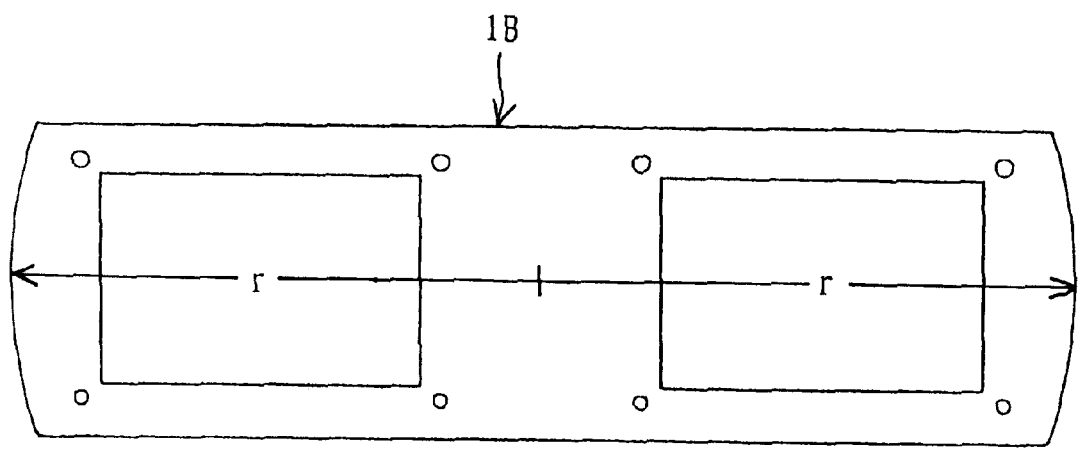
FIG. 8 is a front view showing still another embodiment of the stereo slide mount.

Then, means for further facilitating the insertion of the stereo slide mount is shown in FIG. 8. Referring to FIG. 8, when both the right and left ends of the stereo slide mount 1B are formed in circular arc-shape having a radius r from the center between right and left and upper and lower sides of the stereo slide mount, even if the stereo slide mount 1B is inserted into the slide holder 11 in the attitude that the stereo slide mount 1B is inclined to the right or left, the stereo slide mount 1B is not locked on the midway irrespective of the inclining angle, but can be smoothly inserted. Since the lateral width of the bottom side of the stereo slide mount 1B is considerably shorter than the lateral width of the slide holder, the aligning of both the slide holder and the stereo slide mount 1B at the time of inserting is extremely easy.

Figure 10:
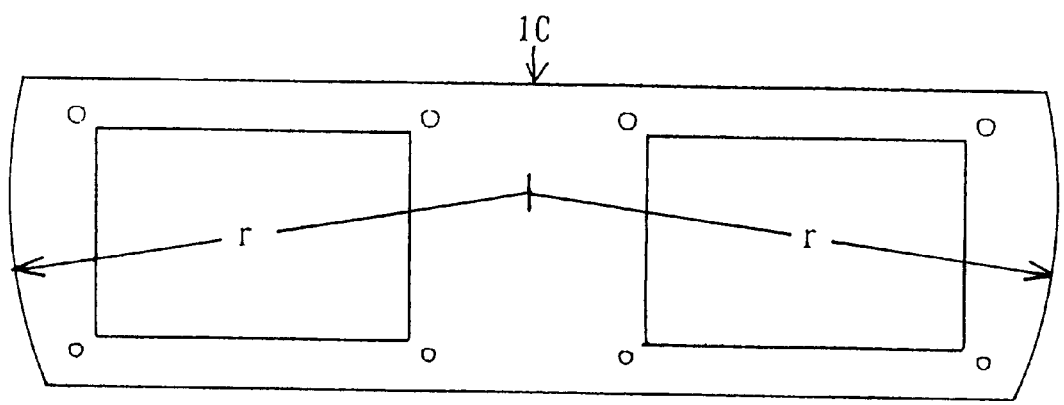
FIG. 10 is a front view showing still another embodiment of the stereo slide mount.

FIG. 10 illustrates still another embodiment. This stereo slide mount 1C is formed by displacing the center of the radius r upward from that of the stereo slide mount 1B of FIG. 8, and has the same operation and effect as those of the stereo slide mount 1B of FIG. 8.

Figure 9:
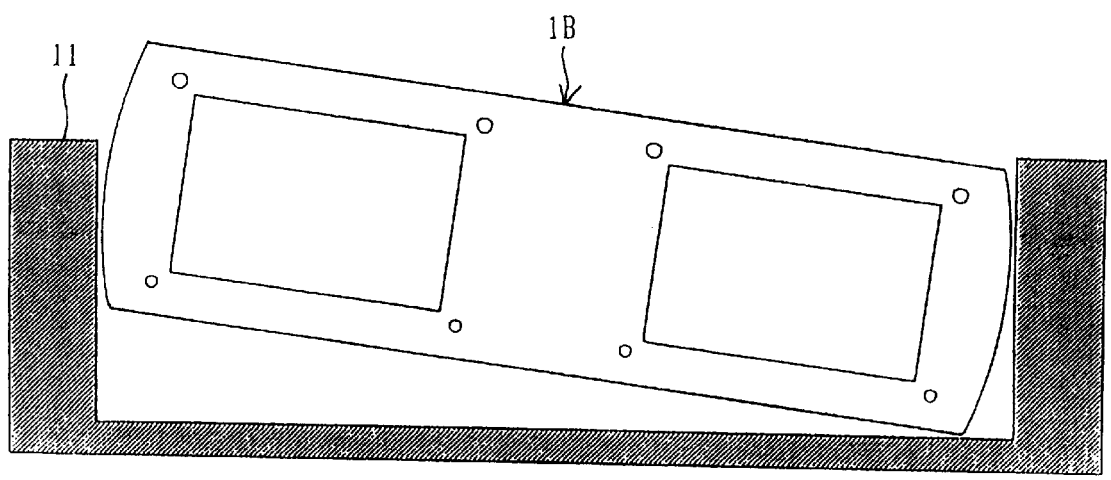
FIG. 9 is a diagram explaining the state at the time of loading the stereo slide mount of FIG. 8.

The stereo slide mounts 1B, 1C illustrated in FIGS. 8 to 10, can be extremely easily inserted into the slide holder. Hence, the inner width of the slide holder 11 is formed nearly equal to the entire width of the stereo slide mounts 1B or 1C to eliminate the lateral gap to be able to accurately position the stereo slide mounts 1B or 1C without providing special positioning means.

An auto-loading type slide projector used by loading many stereo slide mounts in a magazine might cause a loading failure accident due to the locking of the stereo slide mount M as shown in FIG. 7 at the time of auto-loading. However, the side of the stereo slide mount is formed in the above-mentioned circular-arc-shape to prevent the loading failure accident, thereby remarkably improving the operating stability.

Figure 11:
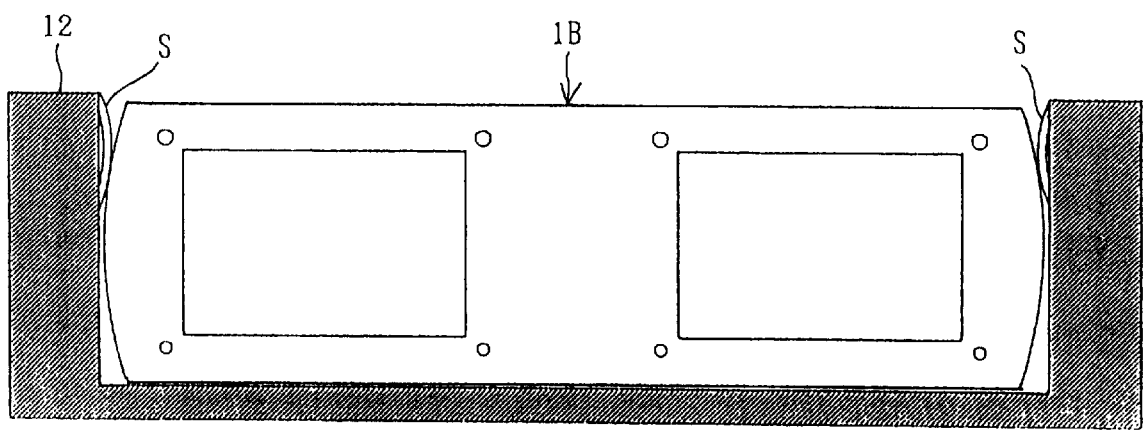
FIG. 11 is a diagram illustrating the state that the stereo slide mount of FIG. 8 is loaded to a slide magazine.

The most magazine of the slide projector urges a leaf spring to both the ends of the stereo slide mount to hold the stereo slide mount. However, both the ends of the stereo slide mount are formed in the circular-arc-shape as shown in FIG. 11 so that the stereo slide mount 1B is urged toward the bottom of the slide holder 11 of the magazine by a leaf spring S to be stably held to prevent the stereo slide mount from being dropped at the time of transporting the magazine.

As described above, the stereo slide mount of the present invention selects the stereo slide mount of the picture width determined by a picture masking-mount guide device to mount the film. Then, the parallax of the subject can be accurately corrected, and even if the widths of the windows of the pictures are different, the pitches of the right and left pictures are all the same. Accordingly, even when the stereo slide mounts having different various picture masking amounts are frequently replaced and appreciated, the optical angles of the right and left eyes are constant, and there is an effect of reducing the eye's fatigue.

The present invention is in no way limited to the above-mentioned embodiments only but can be modified in a variety of ways within the technical scope of the invention, and it should be noted that the present invention encompasses such modified embodiments, as a matter of course.

What is claimed is:

1. A stereo slide mount system comprising plural types of stereo slide mounts and stereo slides photographed using a stereo camera in which pairs of right and left photographed pictures of the stereo slides have a constant position relative to perforations of a perforated film, each said stereo slide mount comprising two pieces of slide film having right and left photographed pictures thereon, a base frame and a cover frame each having two rectangular windows arranged in parallel, positioning pins provided on the film-mounting surface of said base frame to bring the pictures on two pieces of slide films into agreement with the windows upon engagement of said positioning pins with perforations in said two pieces of slide film that is to be fixed, and holes corresponding to said positioning pins formed in the film-holding surface of said cover frame, said positioning pins being fitted to said holes in use in order to join said base frame and said cover frame together, wherein across said plural types of stereo slide mounts the width of the windows gradually decreases relative to the width of pictures on said two pieces of film, right and left windows have a constant predetermined pitch, and said positioning pins and holes of said plural types of stereo slide mounts are positioned so that inner vertical edges of the right and left windows are brought into agreement with the inner vertical edges of the pictures on said two pieces of film, the outer shielding areas of each of said two pieces of film being adjustable according to the difference in the widths of the windows of said plural types of stereo slide mounts.

2. A stereo slide mount system according to claim 1, wherein a hinge is formed at a center between right and left portions of said base frame of each stereo slide mount so that the right and left portions can be bent towards or away from each other.

3. A stereo slide mount system as claimed in claim 2, wherein each of said stereo slide mounts further comprises:
    a vertical groove for engagement with a corresponding positioning spring formed in a slide holder.

4. A stereo slide mount system as claimed in claim 2, wherein each of said stereo slide mounts further comprises:
    a notch at the bottom edge thereof for engagement with a corresponding protrusion formed at the bottom of a slide holder.

5. A stereo slide mount system as claimed in claim 2, wherein said hinge provides positioning means at the bottom edge of each said stereo slide mount.

6. A stereo slide mount system as claimed in claim 1, wherein each of said stereo slide mounts further comprises:
    a vertical groove for engagement with a corresponding positioning spring formed in a slide holder.

7. A stereo slide mount system as claimed in claim 1, wherein each of said stereo slide mounts further comprises:

a notch at the bottom edge thereof for engagement with a corresponding protrusion formed at the bottom of a slide holder.

8. A stereo slide mount system as claimed in claim 1, wherein said stereo slide mounts are each provided with arc-shaped ends to facilitate insertion into a slide holder.

9. A stereo slide system comprising:

a plurality of stereo slide mounts, each of said plurality of stereo slide mounts having a first window with a first width and a first center, and a second window with a second width and a second center, the first and second windows being separated by a gap width, wherein each of said plurality of stereo slide mounts has different first and second window widths and different gap widths while maintaining a constant pitch between the first and second centers of the first and second window widths, and the gap width for each one of said plurality of stereo slide mounts is equal to the smallest gap width of any of said plurality of stereo slide mounts plus the difference between the smallest window width of any of said plurality of stereo slide mounts and a window width of the one of said plurality of stereo slide mounts having the gap width, whereby one of said plurality of stereo slide mounts may be selected to optimize the viewing of a stereo slide.

10. A stereo slide system as in claim 9 wherein:

each of said plurality of stereo slide mounts has circular-arc-shaped lateral edges.

11. A stereo slide system as in claim 10 wherein:

the circular-arc-shaped lateral edges have a radius formed from a center displaced from the center of each of said plurality of stereo slide mounts.

12. A stereo slide system in which pairs of photographed pictures are mounted having a constant position relative to perforations in a film, each mount comprising:

a pair of photographed pictures, each on a slide film;

a base frame having two windows arranged in parallel and separated by a gap;

a cover frame having two windows arranged in parallel;

positioning pins on said base frame; and holes corresponding to said positioning pins formed in said cover frame, wherein the various mounts of the stereo slide mount system have window widths that decrease relative to the width of each of the pictures of said pair of photographed pictures, the two windows have a constant predetermined pitch, and said positioning pins and said holes are positioned so that the inner vertical edges of the two windows are brought into agreement with the inner vertical edges of the photographed pictures on the slide film, and outer shielding areas are adjusted according to differences in the window widths.

13. A stereo slide system as in claim 12 wherein:

each said mount has circular-arc-shaped lateral edges.

14. A stereo slide system as in claim 13 wherein:

the circular-arc-shaped lateral edges have a radius formed from a center displaced from the center of each of said plurality of stereo slide mounts.

* * * * *